US008848794B2

(12) United States Patent
Lee et al.

(10) Patent No.: US 8,848,794 B2

(45) Date of Patent: Sep. 30, 2014

(54) METHOD AND DEVICE FOR VIDEO CODING AND DECODING

(75) Inventors: Chung-Ku Lee, Incheon (KR); Euee-Seon Jang, Seoul (KR); Sun-Young Lee, Seoul (KR); Myung-Jung Lee, Seoul (KR); Jae-Bum Jun, Seoul (KR)

(73) Assignee: Humax Holdings Co., Ltd., Yongin-Si (KR)

( * ) Notice: Subject to any disclaimer, the term of this patent is extended or adjusted under 35 U.S.C. 154(b) by 434 days.

(21) Appl. No.: 12/809,025

(22) PCT Filed: Dec. 18, 2008

(86) PCT No.: PCT/KR2008/007532

§ 371 (c)(1), (2), (4) Date: Jul. 21, 2010

(87) PCT Pub. No.: WO2009/078686

PCT Pub. Date: Jun. 25, 2009

(65) Prior Publication Data

US 2010/0278268 A1 Nov. 4, 2010

(30) Foreign Application Priority Data

Dec. 18, 2007 (KR) ........................ 10-2007-0133471
Dec. 18, 2008 (KR) ........................ 10-2008-0129650

(51) Int. Cl.

*H04N 7/26* (2006.01)
*H04N 19/172* (2014.01)
*H04N 19/176* (2014.01)
*H04N 19/154* (2014.01)
*H04N 19/102* (2014.01)
*H04N 19/124* (2014.01)
*H04N 19/61* (2014.01)
*H04N 19/51* (2014.01)

(52) U.S. Cl.

CPC ........... *H04N 7/468* (2013.01); *H04N 7/26271* (2013.01); *H04N 7/26244* (2013.01); *H04N 7/26196* (2013.01); *H04N 7/26111* (2013.01); *H04N 7/26079* (2013.01); *H04N 7/50* (2013.01)

USPC ................................ 375/240.16; 375/240.01

(58) Field of Classification Search

USPC .................................................... 375/240.16

See application file for complete search history.

(56) References Cited

U.S. PATENT DOCUMENTS 5,617,144 A 4/1997 Lee
6,400,763 B1 * 6/2002 Wee ......................... 375/240.16
2002/0122598 A1 9/2002 Ribas-Corbera et al.

(Continued)

FOREIGN PATENT DOCUMENTS

KR 2002-0074328 A 9/2002

*Primary Examiner* — Mehrdad Dastouri
*Assistant Examiner* — Obafemi Sosanya
(74) *Attorney, Agent, or Firm* — Birch, Stewart, Kolasch & Birch, LLP

(57) ABSTRACT

A method of encoding/decoding a video and an apparatus thereof are disclosed. An embodiment of the present invention provides an encoding/decoding method and apparatus thereof that can interpolate a frame to be skipped with the consideration of the property of the frame. Accordingly, an embodiment of the present invention can encode and decode by using a frame-skipping method having low complexity.

4 Claims, 17 Drawing Sheets

(56) References Cited

U.S. PATENT DOCUMENTS

2003/0169817 A1* 9/2003 Song et al. ............... 375/240.13
2004/0017850 A1 1/2004 Kim et al.
2004/0101058 A1* 5/2004 Sasai et al. ............... 375/240.26
2005/0228849 A1* 10/2005 Zhang ........................... 709/200
2006/0133482 A1* 6/2006 Park et al. ................ 375/240.08
2008/0007614 A1* 1/2008 Mizuhashi et al. ........ 348/14.01
2010/0002132 A1* 1/2010 Kobayashi .................... 348/452
2010/0027686 A1* 2/2010 Zuo et al. ................. 375/240.29

* cited by examiner (a) MCS = 3

(b) MCS = 7

(c) MCS = 12

Akiyo

METHOD AND DEVICE FOR VIDEO CODING AND DECODING

TECHNICAL FIELD

The present invention relates to a video encoding and decoding, more specifically to a method of performing the encoding and decoding by using frame-skipping and an apparatus thereof.

BACKGROUND ART

With the increase of data transmission capacity per second through the Internet, there has been an increased amount of multimedia data, including video and picture files, than the past, when simple text data had been mostly transmitted. Accordingly, there has been an increased demand for video compression technologies.

Unlike the method of compressing still images (e.g. photographs), the video compression method compresses a plurality of frames. Accordingly, the video compression method can compress videos by using certain relationships between frames. For example, the video compression method can acquire high compression ratio and high video quality by using the relationship between pixels corresponding to a plurality of frames.

The video compression method can also perform the compression more efficiently by using the frame-skipping technology, which performs the compression by skipping certain frames. The frame-skipping technology is divided into a fixed frame-skipping type and a variable frame-skipping type. The fixed frame-skipping type needs no complex pre-treating process. The fixed frame-skipping type, however, has some problems that the compression is performed by skipping important data frames or frames that are difficult to interpolate. The variable frame-skipping type has been developed to solve the problem. However, this variable frame-skipping type typically analyzes the whole video sequence. This has high complexity so that it is difficult to process videos in real time. The variable frame-skipping type also depends on the encoding technology.

DISCLOSURE

Technical Problem

The present invention provides an encoding/decoding method and apparatus that uses a frame-skipping method having low complexity.

The present invention also provides an encoding/decoding method and apparatus that uses an independent frame-skipping method to the video and encoding technology.

The present invention provides an encoding/decoding method and apparatus that can interpolate an interpolation-target frame in consideration of the property of a skipped frame.

The present invention provides an interpolation apparatus and method that can interpolate target frames differently according to macroblock types.

In addition, the present invention provides an interpolation apparatus and method that can interpolate a plurality of successive target frames according to the ratios corresponding to the locations of the interpolation-target frames.

Technical Solution

An aspect of the present invention features an encoding/decoding apparatus using frame-skipping.

In accordance with an embodiment of the present invention, an apparatus for encoding by using frame-skipping can include: a cluster set-up configure to set one or more frames as a cluster by using the similarity of adjacent frames of an inputted video; a key frame set-up configured to set one or more frames composing the cluster as a key frame; and an encoder configured to encode the key frame and generate encoding abbreviation data for a frame that is not encoded.

In accordance with another embodiment of the present invention, an apparatus for decoding by using interpolation can include: a decoder configured to decode an inputted bitstream; a data acquisition unit configured to acquire interpolation frame data, one or more reference frames, a macroblock type and one or more motion vector values from the decoder; and an interpolation processer configured to compute ratio data of an interpolation-target frame by using the interpolation frame data, and interpolating an interpolation-target frame by using the ratio data, the pixel data of the reference frame or the motion vector value according to the macroblock type.

Another aspect of the present invention features a method of encoding/decoding using frame-skipping.

In accordance with an embodiment of the present invention, a method of encoding by using frame-skipping can include: setting one or more frames as a cluster by using the similarity of adjacent frames of an inputted video; setting one or more frames composing the cluster as a key frame; and encoding the key frame and generating encoding abbreviation data for a frame that is not encoded.

In accordance with another embodiment of the present invention, a method of decoding a skipped frame by using interpolation, performed by a decoding apparatus, can include: decoding an inputted bitstream and acquiring interpolation frame data, one or more reference frames, a macroblock type and a motion vector value; computing ratio data of an interpolation-target frame by using the interpolation frame data; and interpolating the interpolation-target frame differently by using the ratio data, pixel data of the reference frame or the motion vector value according to the macroblock type.

Advantageous Effects

The present invention can perform the encoding and decoding by using a frame-skipping method having low complexity, by providing an encoding/decoding method and apparatus in accordance with an embodiment of the present invention.

The present invention can perform the encoding and decoding by applying an independent frame-skipping method to the video and encoding technology.

The present invention can interpolate an interpolation-target frame in consideration of the property of a skipped frame.

The present invention can interpolate interpolation-target frames differently according to macroblock types.

In addition, the present invention can interpolate a plurality of successive interpolation-target frames according to the ratios corresponding to the locations of the interpolation-target frames.

DESCRIPTION OF DRAWINGS

FIG. 7 shows a video that is encoded and decoded by determining a Qp value as 16 in the MPEG-4 SP (simple profile) environment.

FIG. 8 shows a video in which a bitstream encoded by adjusting a Qp value to 9 is decoded in accordance with an embodiment of the present invention.

FIG. 13 through FIG. 16 show interpolated interpolation-target frames in accordance with an embodiment of the present invention.

MODE FOR INVENTION

Figure 1:
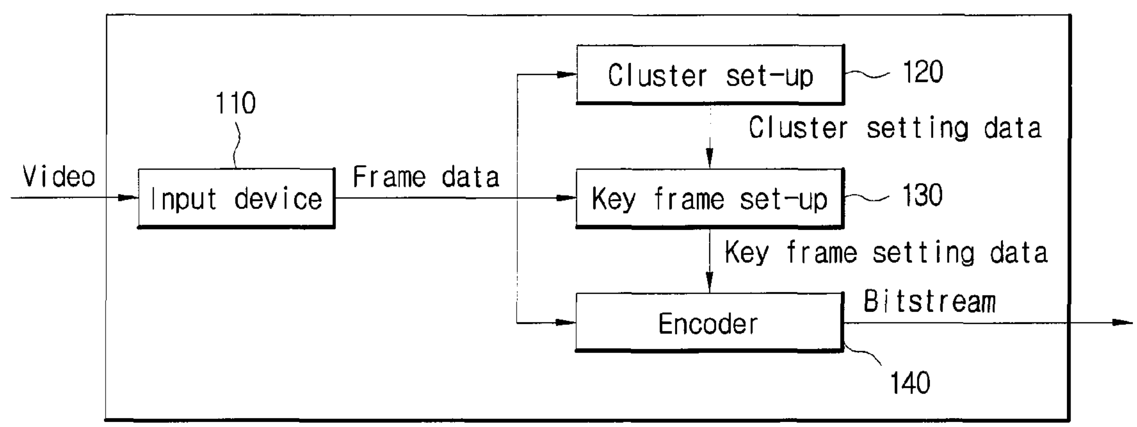
FIG. 1 shows the structure of an encoding apparatus in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some elements of an encoding apparatus that uses frame skipping will be described with reference to FIG. 1.

FIG. 1 shows the structure of an encoding apparatus in accordance with an embodiment of the present invention.

With reference to FIG. 1, an encoding apparatus in accordance with an embodiment of the present invention includes an input device 110, a cluster set-up 120, a key frame set-up 130, and an encoder 140.

The input device 110 receives a video from an external device. For example, the input device 110 receives an image captured and generated by the camera. Also, the input device 110 can receive a video saved in a storage device besides the camera or a video through a network.

In other words, the input device 110 outputs frame data of a video, which is inputted from an external storage device, to the cluster set-up 120, the key frame set-up 130, and the encoder 140 as the frame data of the video.

The cluster set-up 120 parses the video inputted from the input device 110, and sets successive similar frames to one cluster. At this time, the cluster set-up 120 first sets a maximum cluster size for the cluster setting. Accordingly, an encoding apparatus in accordance with an embodiment of the present invention can regulate the video frame drop rate and the number of key frames regenerated for a certain time. For example, if the maximum cluster size of the video in which the frame rate is 30 frames/sec is 30, at least one cluster exists per one second. Because each of the clusters has more than one key frame, the key frame in the cluster is regenerated at least more than once per one second. At this time, the maximum cluster size may be set by a user.

Subsequently, the cluster set-up 120 sets the cluster on the basis of the similarity of adjacent frames. For example, the cluster set-up 120 may set on the basis of PSNR (Peak Signal to Noise Ratio). The PSNR is one of the indexes that represent the association between two frames, and is computed by formula 1.

$$PSNR(x, y) = 10\log_{10}\sum_{i=1}^{M}\frac{255^2}{(x_i - y_i)^2} \qquad \text{[Formula 1]}$$

Here, x is a frame (a target frame) that sets the current cluster; y is a frame (a reference frame) that is referenced for the cluster setting of the target frame; xi is an ith pixel value of the target frame; yi is an ith pixel value of the reference frame; and M is the number of pixels in one frame.

Hereinafter, although it is assumed that the reference frame is described as a former frame of the target frame, in some cases it shall be evident to a person of ordinary skill that the reference frame is set differently.

Computing the PSNR of each of the frames, the cluster set-up 120 sets the target frame satisfying the below formula 2 to the same cluster of the reference frame.

$$\mathrm{PSNR}(i,i+1) \geq T \qquad \text{[Formula 2]}$$

Here, i is a frame number, and T is a threshold value that is set by the user or set as a default.

For example, the cluster set-up 120 first sets a first frame to one cluster for the cluster setting of three frames. At this time, it is assumed that the PSNR of a second frame is above T, and the PSNR of a third frame is below T. Subsequently, the cluster set-up 120 computes the PSNR of the second frame by referencing the first frame. Because the PSNR is above T, the second frame is added to the cluster that contains the first frame. And then, the cluster set-up 120 computes the PSNR of the third frame. At this time, because the PSNR is below T, the cluster set-up 120 sets the third frame to a new cluster. In other words, the first frame and the second frame are set to one cluster, and the third frame is set to another cluster. The cluster set-up 120 repeats the foregoing processes for each of the frames, generates the cluster setting data of the entire video, and transmits the cluster setting data to the key frame set-up 130.

The key frame set-up 130 sets more than one frame, which is contained in the cluster, to the key frame. At this time, according to the user's setting or default setting, the key frame set-up 130 may differ the key frame setting. For example, the key frame set-up 130 may use one of such methods as the method of setting a first frame and a last frame of the cluster to the key frames, the method of setting the key frame at an interval of multiple fixed number, the method of setting a first frame, a middle frame and a last frame to the key frames, and the method of choosing a fixed number of the frames according to a low order of the PSNRs among the frames in the cluster. At this time, for the purpose of clarification, it shall be assumed that the key frame set-up 130 sets a first frame and a last frame of the cluster to the key frames.

The key frame set-up 130 may set to make any one cluster share the key frame with another cluster after the cluster and the key frame are set. Described below is in more detail with reference to FIG. 2 and FIG. 3.

Figure 2:
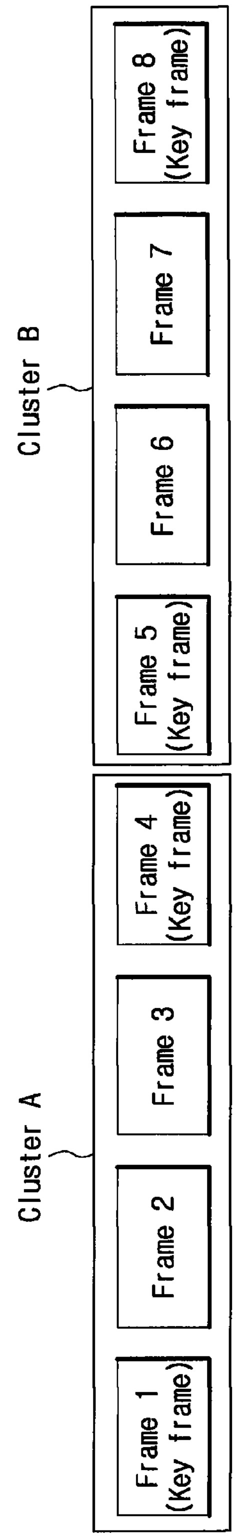
FIG. 2 shows the structure of a cluster when no setting is performed to share a key frame in accordance with an embodiment of the present invention.
Figure 3:
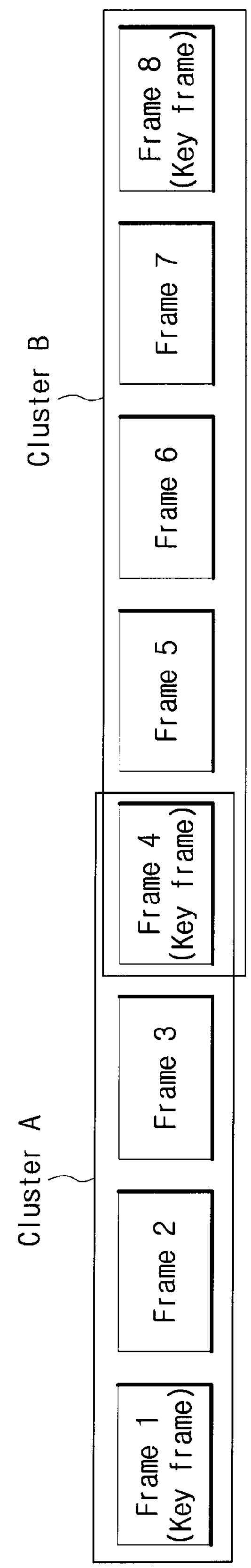
FIG. 3 shows the structure of a cluster in which a key frame is shared in accordance with an embodiment of the present invention.

FIG. 2 shows the structure of a cluster when no setting is performed to share a key frame in accordance with an embodiment of the present invention, and FIG. 3 shows the structure of a cluster in which a key frame is shared in accordance with an embodiment of the present invention.

With reference to FIG. 2 and FIG. 3, in order to share the key frame, the key frame set-up 130 measures the PSNR between a last key frame (frame 4) of a former cluster (cluster A) and a second frame (the frame which is located right next to a first frame, frame 6) of the target cluster (cluster B) in FIG. 2. If the PSNR is above the forgoing threshold value T, the key frame setting of the first frame (frame 5) of the target cluster is released. In other words, the target cluster uses the last key frame (frame 4) of the former cluster (cluster A) as the key frame instead of the first frame (frame 5). Consequently, as is illustrated in FIG. 3, the key frame set-up 130 expands to make the target cluster contain the frame 4, and sets frame 4 and frame 8 to the key frames of the target cluster. At this time, the key frame set-up 130 generates key frame setting data which is the location data of the key frame and the abbreviated frame being set through the foregoing processes, and transmits the key frame setting data to an encoder 140. Also, the key frame set-up 130 repeats the above processes for each of the clusters.

Again with reference to FIG. 1, the encoder 140 uses the key frame setting data to extract and encode only the key frames from the video. At this time, the encoder 140 generates encoding abbreviation data, which is the data of the encoding abbreviation frames. For example, in the case of encoding the key frame by using MPEG-4 SP, the encoder 140, designating a syntax value of vop_time_increment in MPEG-4 SP spec to the number of the frames located between the target frame and a former frame, can indicate the encoding abbreviation data. With reference to the syntax data, the decoder can seize the data of the encoding abbreviated frame and the location of the key frame and perform decoding. Also, the encoder 140 may include the encoding abbreviation data on the bitstream or generate an additional file except the forgoing method.

Hereinafter, encoding processes performed by using frame-skipping in accordance with an embodiment of the present invention will be described with reference to FIG. 4 and FIG. 5. Although each of the steps in the following description is performed by each of the internal component parts of an encoding apparatus, for the convenience of description and understanding, they will be collectively referred to as the encoding apparatus.

Figure 4:
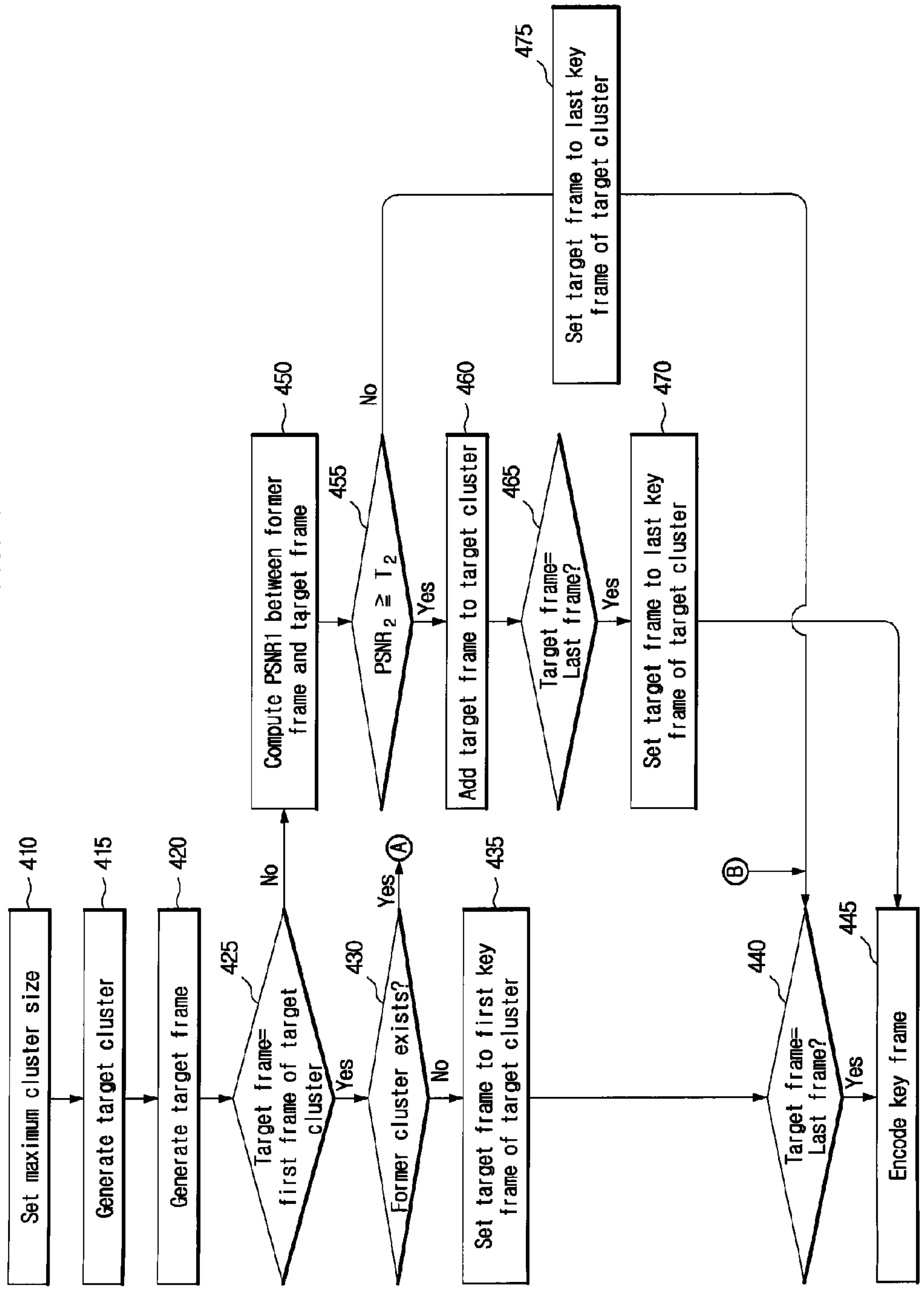
FIGS. 4 and 5 are flowcharts showing encoding processes performed by using frame-skipping in accordance with an embodiment of the present invention.
Figure 5:
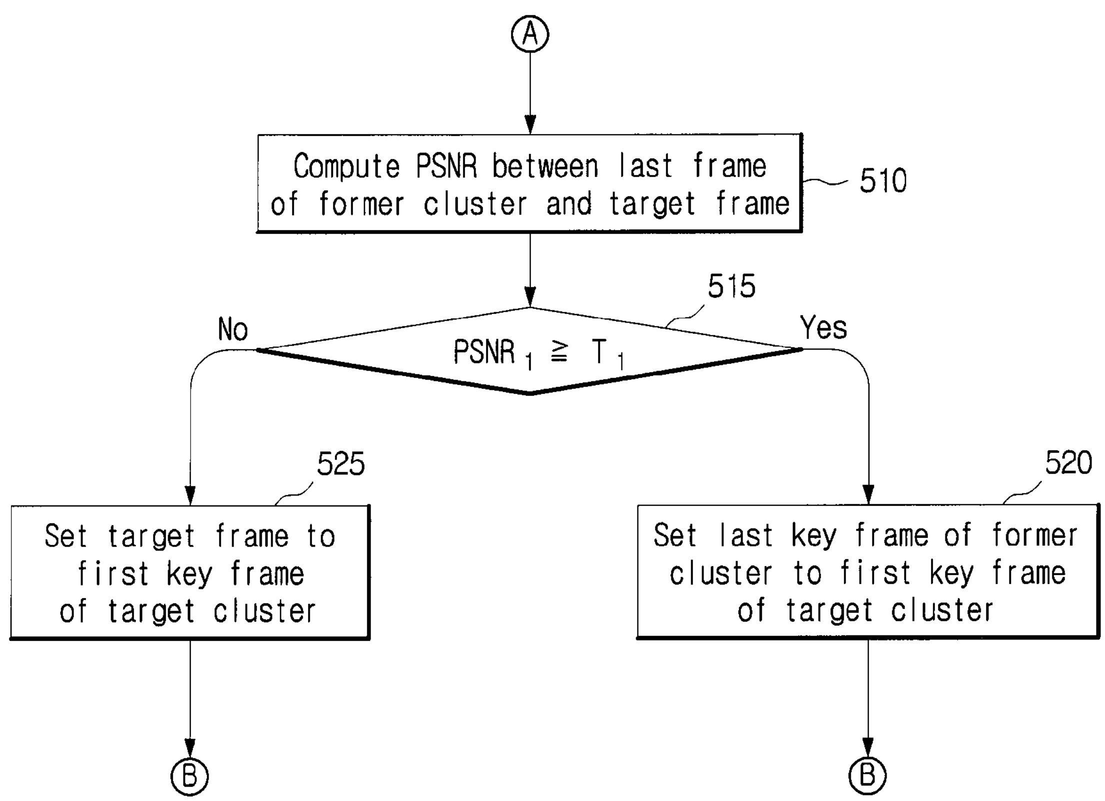

FIGS. 4 and 5 are flowcharts showing encoding processes performed by using frame-skipping in accordance with an embodiment of the present invention.

With reference to FIGS. 4 and 5, in the step 410, the encoding apparatus sets a maximum cluster size.

In the step 415, the encoding apparatus generates a target cluster.

In the step 420, the encoding apparatus reads a frame. Hereinafter, for the convenience of description and understanding, the read frame will be described as a target frame.

In the step 425, the encoding apparatus determines whether the target frame is a first frame of the target cluster.

If the target frame is the first frame of the target cluster, in the step 430, the encoding apparatus determines whether a former cluster exists.

If the former cluster does not exist, in step 435, the encoding apparatus sets the target frame to a first key frame of the target cluster.

In the step 440, the encoding apparatus determines whether the target frame is a last frame.

If the target frame is the last frame, in the step 445, the encoding apparatus encodes the frames being set to the key frame. Then, the encoding apparatus, generating an encoding abbreviation data for the frame that is not encoded, includes the encoding abbreviation data on a bitstream or generates and transmits an additional file.

However, if the target frame is not the last frame, the encoding apparatus progresses to the step 420. However, if the target frame is not the last frame after the target frame is set to the last key frame of the target cluster, the step 415 is progressed in order to generate a new cluster.

In other words, if the last key frame of the target cluster is set, the setting of the target cluster is ended. Then, the target cluster is set to a former cluster. The new cluster can be generated and set to the target cluster.

Here, the encoding abbreviation data may be location data of the abbreviated frame.

If the target frame is not the last frame, the encoding apparatus determines whether the number of frames included in the target cluster exceeds the maximum cluster size. In the case of exceeding the maximum cluster size, the encoding apparatus may end adding the frame to the target cluster by force and collect the similar frames by generating the new cluster.

The case of the former cluster existing as a result of the step 430, will be described with reference to FIG. 5.

In case that the former cluster exists, in the step 510, a PSNR between the last frame of the former cluster and the target frame (hereinafter, for the convenience of description and understanding, it is referred to as a first PSNR) is computed. The present description will assume and describe that the similarity of adjacent frames is computed by using the PSNR. However, in addition to the PSNR, it shall be evident that SAD, MSE (mean squared error) and the like, which could compute a correlation between the frames, can be used equally.

In the step 515, the encoding apparatus determines whether the first PSNR is above the first critical value.

If the first PSNR is above the first critical value, in the step 520, the encoding apparatus sets the last key frame of the former cluster to the first key frame of the target cluster. Then, the encoding apparatus progresses to the step 440 in FIG. 4.

However, if the first PSNR is below the first critical value, in the step 525, the encoding apparatus sets the target frame to the first key frame of the target cluster. Then, the encoding apparatus progresses to the step 440 in FIG. 4.

As a result of the step 425, if the target frame is not the first frame of the target cluster, in the step 450, the encoding apparatus computes the PSNR between the former frame and the target frame (hereinafter, for the convenience of description and understanding, it is referred to as a second PSNR).

In the step 455, the encoding apparatus determines whether the second PSNR is above the second critical value.

If the second PSNR is above the second critical value, in the step 460, the encoding apparatus adds the target frame to the target cluster.

Then, in step 465, the encoding apparatus determines whether the target frame is the last frame.

If the target frame is the last frame, in the step 470, the encoding apparatus sets the target frame to the last key frame of the target cluster. Then, the encoding apparatus progresses to the step 445.

If the second PSNR is below the second critical value, in the step 475, the encoding apparatus sets the target frame to the last key frame of the target cluster. Then, the encoding apparatus progresses to the step 440. Here, if the target frame is not the last frame after setting the last key frame of the target cluster, the encoding apparatus may set the target cluster to the former cluster and generate a new cluster as the target cluster. In the present description, when the last key frame is set in the target cluster, the setting of the target cluster is ended, and a new cluster can be generated.

Similarly, it may add the frames to the target cluster and set the key frame in the cluster by using the similarity of adjacent frames.

Hereinafter, with reference to FIGS. 6 through 9, the result after performing an encoding method in accordance with an embodiment of the present invention will be described.

Figure 6:
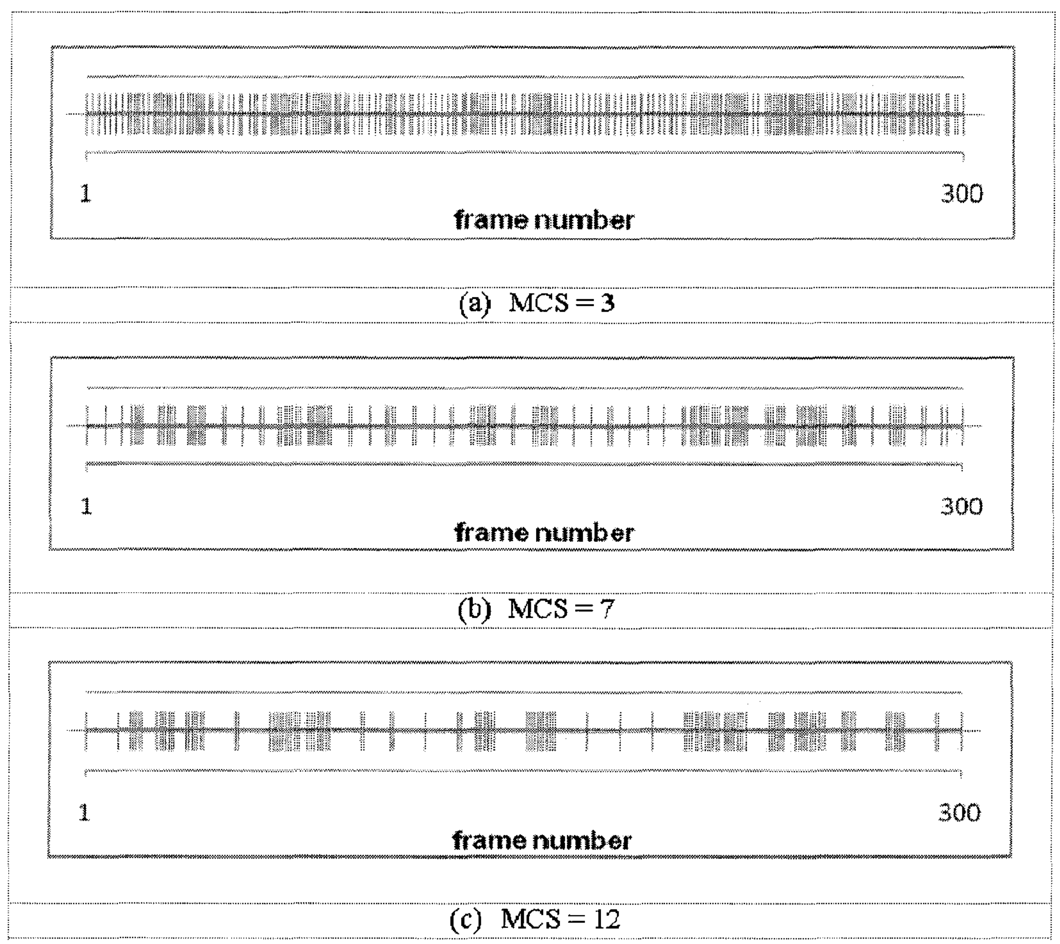
FIG. 6 is a graph corresponding to a key frame selected when a maximum cluster size is changed in an input video.
Figure 9:
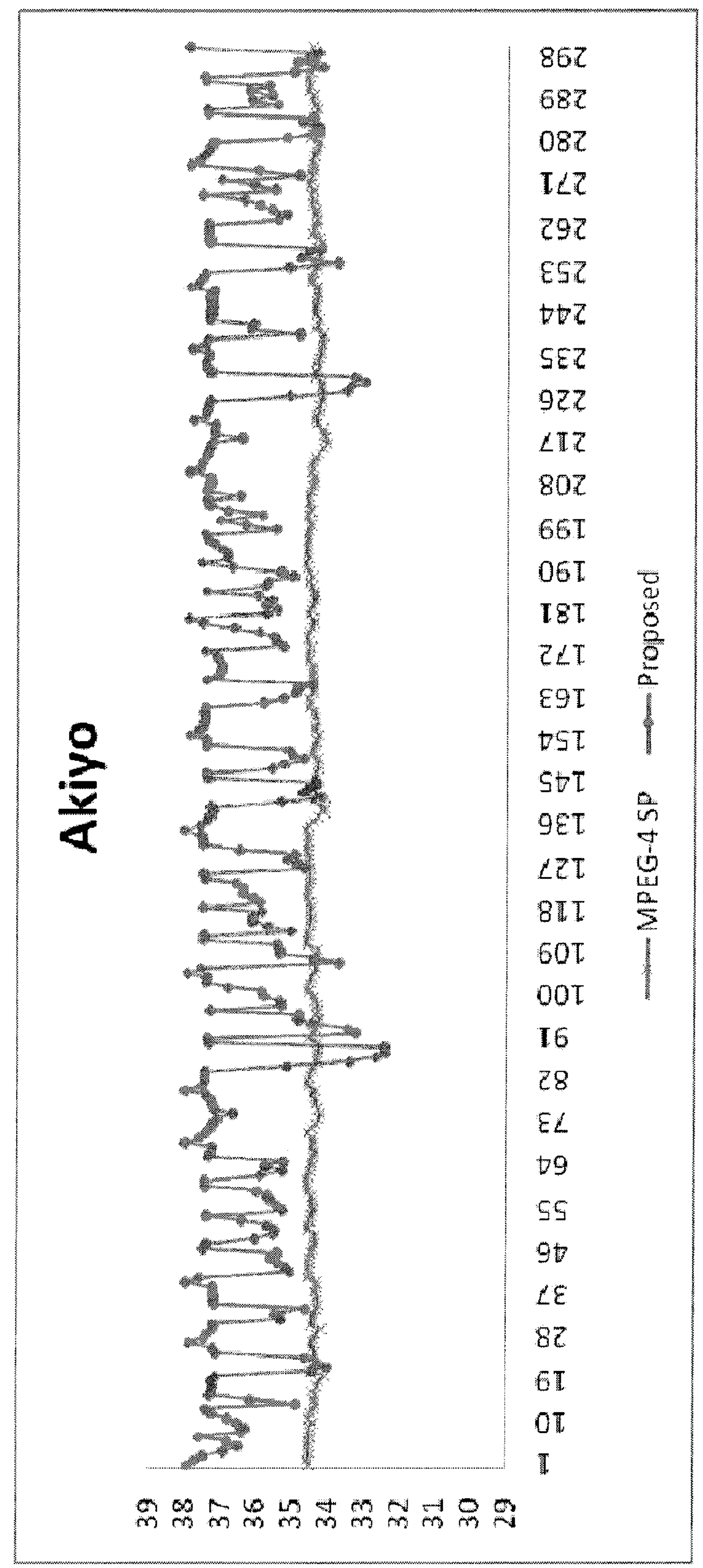
FIG. 9 is a graph showing PSNR of the videos shown in FIG. 7 and FIG. 8.

FIG. 6 is a graph corresponding to a key frame selected when a maximum cluster size is changed in an input video, and FIG. 7 shows a video that is encoded by determining a Qp value as 16 in the MPEG-4 SP (simple profile) environment. FIG. 8 shows a video in which a bitstream encoded by adjusting a Qp value to 9 is decoded in accordance with an embodiment of the present invention, and FIG. 9 is a graph showing PSNR of the videos shown in FIG. 7 and FIG. 8.

The following table 1 is the videos used in an encoding experiment in accordance with an embodiment of the present invention. The encoding apparatus is experimented by using three videos. Hereinafter, for the purpose of clear description, it will be described as focusing on a result of experiment that uses the Akiyo video as an input video.

TABLE 1

| Test Image | Resolution | No. of Frames | FPS |
|---|---|---|---|
| Akiyo | CIF (352 × 288) | 300 | 30 |
| Container | CIF (352 × 288) | 300 | 30 |
| Stefan | CIF (352 × 240) | 300 | 30 |

Table 2 illustrates the result of the encoding experiment in accordance with an embodiment of the present invention. In the encoding experiment, a threshold value is set appropriately for each of the videos differently.

TABLE 2

| Test Image | Max cluster size (frames) | T (dB) | Number of clusters | Number of key frames (average fps) |
|---|---|---|---|---|
| Akiyo | 3 | 38 | 85 | 215 (21.5) |
| | 7 | 38 | 36 | 141 (14.1) |
| | 12 | 38 | 24 | 124 (12.4) |
| Container | 3 | 38.2 | 75 | 225 (22.5) |
| | 7 | 38.2 | 40 | 150 (15.0) |
| | 12 | 38.2 | 30 | 124 (12.4) |
| Stefan | 3 | 23 | 11 | 289 (28.0) |
| | 7 | 23 | 6 | 282 (28.2) |
| | 12 | 23 | 5 | 280 (28.9) |

FIG. 6 illustrates a location of the key frame setting when the maximum cluster size is changed. As shown in FIG. 6, it can be inferred that the cluster sizes divided through the changed distribution of the key frame and PSNR according to the maximum cluster size are various.

Table 3 illustrates encoding times when the encoding in accordance with an embodiment of the present invention is performed. Table 3 illustrates that, through the encoding in accordance with an embodiment of the present invention by using MPEG-4 Simple Profile, the whole the encoding times are shortened because of a decrease in the complexity in the encoding by as much as the number of the abbreviated frames.

TABLE 3

| | Test | | Max cluster size | | |
|---|---|---|---|---|---|
| | image | MPEG-4 SP | 3 | 7 | 12 |
| Encoding Time | Akiyo | 14.64 | 11.90 | 8.42 | 7.78 |
| | Container | 19.56 | 18.87 | 14.78 | 13.04 |
| | Stefan | 33.08 | 31.81 | 31.63 | 32.22 |

Table 4 illustrates encoding results when the encoding apparatus in accordance with an embodiment of the present invention changes the Qp value, which is the parameter for the video quality of MPEG-4. As shown in Table 4, it can be inferred that, by changing the Qp value and the maximum cluster size, the size of the compressed bitstream is reduced. FIG. 8 is a video that is encoded by adjusting a Qp value to 9 and the maximum cluster size to 7, and it shows better video quality than a video in FIG. 7, which is encoded by using ordinary MPEG-4 Simple Profile and adjusting a Qp value to 16. In conclusion, the encoding apparatus in accordance with an embodiment of the present invention can guarantee the compression efficiency and the high video quality through changing the Qp value and the maximum cluster size. Seeing the PSNRs of a video that is encoded by ordinary MPEG-4 Simple Profile and a video that is encoded by the encoding apparatus in accordance with an embodiment of the present invention in FIG. 9, the video quality of the video, which is encoded by the encoding apparatus in accordance with an embodiment of the present invention, is relatively improved.

TABLE 4

| Test sequence | Method | | Qp | Coding frames | Bitstream size (byte) |
|---|---|---|---|---|---|
| Akiyo | MPEG-4 SP | | 16 | 300 | 138,323 |
| | Max | 3 | 12 | 215 | 134,330 |
| | cluster | 7 | 9 | 141 | 127,858 |
| | size | 12 | 8 | 124 | 125,174 |
| Container | MPEG-4 SP | | 16 | 300 | 228,041 |
| | Max | 3 | 14 | 225 | 210,438 |
| | cluster | 7 | 10 | 150 | 216,991 |
| | size | 12 | 9 | 124 | 218,381 |

TABLE 4-continued

| Test sequence | Method | | Qp | Coding frames | Bitstream size (byte) |
|---|---|---|---|---|---|
| Stefan | MPEG-4 SP | | 16 | 300 | 1,094,888 |
| | Max | 3 | 16 | 289 | 1,074,832 |
| | cluster | 7 | 16 | 282 | 1,060,963 |
| | size | 12 | 16 | 280 | 1,049,128 |

Figure 10:
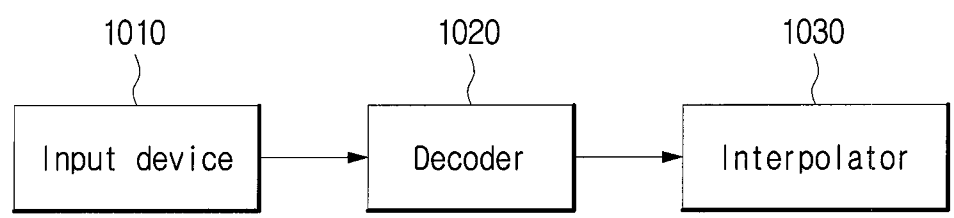
FIG. 10 is a block diagram briefly showing the structure of a decoding apparatus that uses interpolation in accordance with an embodiment of the present invention.

FIG. 10 is a block diagram briefly showing the structure of a decoding apparatus that uses interpolation in accordance with an embodiment of the present invention. Hereinafter, the decoding apparatus that can decode by interpolating the skipped frames will be described.

With the reference to FIG. 10, a decoding apparatus 1000 includes an input device 1010, a decoder 1020 and an interpolator 1030.

The input device 1010 receives a bitstream from the outside and outputs the bitstream to the decoder 1020. Here, the bitstream is a bit array corresponding to a video that is encoded by using the frame skipping.

The decoder 1020 decodes the bitstream inputted through the input device 1010 according to the method of decoding which is previously set, acquires the data for the interpolation (for example, the data of reference frames, the macroblock type, the motion vector value, the frame interpolation data, etc.), and outputs the data to the interpolator 1030.

For example, suppose the bitstream is the encoded video corresponding to MPEG-4 SP (simple profile). The decoder 1020 parses the bitstream, extracts a syntax value of vop_time_increment, and sets it to the frame interpolation data. Here, the frame interpolation data is the number of frames that will be interpolated. Also, the decoder 1020 parses the bitstream, extracts the syntax value of mcbpc, and sets it to the macroblock type.

Because the bitstream is assumed to be encoded and decoded corresponding to MPEG-4 SP (simple profile), although the present description describes that each of the syntax is vop_time_increment, mcbpc, horizontal_mv_data, vertical_mv_data, it shall be evident that the syntax for generating the interpolation data varies when a method of the encoding and decoding varies. Because it is obvious to a skilled person, the additional description will be omitted.

The interpolator 1030 interpolates the frame by using the decoded frame (hereinafter, for the convenience of description and understanding, the decoded frame is referred to as "reference frame") and interpolation data through the decoder 1020. To be more specific, the interpolator 1030 interpolates the interpolation-target frame by using the macroblock type and the ratio data. The macroblock types are INTRA, INTER, and SKIP. The ratio data is the ratio between the frame that will be interpolated (hereinafter, for the convenience of description and understanding, it is referred to as an interpolation-target frame) and the reference frames. Hereinafter, in the present description, for the convenience of description and understanding, a pixel interpolated in the interpolation-target frame is referred to as an interpolation-target pixel.

Hereinafter, the interpolator 1030 will be described in detail with reference to FIG. 11.

Figure 11:
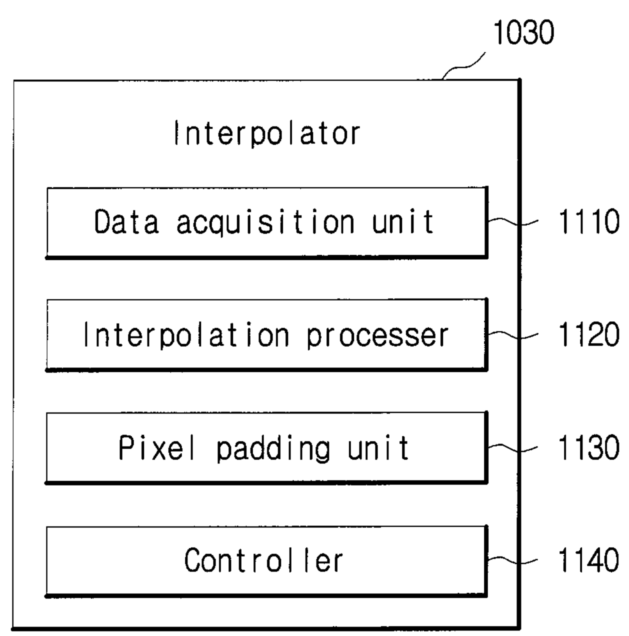
FIG. 11 is a block diagram briefly showing the structure of an interpolator in accordance with an embodiment of the present invention.

FIG. 11 is a block diagram briefly showing the structure of an interpolator in accordance with an embodiment of the present invention.

With the reference to FIG. 11, the interpolator 1030 includes a data acquisition unit 1110, an interpolation processer 1120, a pixel padding unit 1130, and a controller 1140.

The data acquisition unit 1110 acquires various data for frame interpolation from the decoder 1020, and outputs to the interpolation processer 1120. To be more specific, the data acquisition unit 1110 acquires the pixel data of the front and back frame of the interpolation-target frame and outputs to the interpolation processer 1120.

The interpolation processer 1120 determines the location of the interpolation-target frame, and using this, computes the ratio data of the interpolation-target frame. For example, suppose that the frame interpolation data (namely, the number of interpolation-target frames) is 4. And, suppose that the interpolation-target frame that is interpolated at the present time is the first frame of the frame interpolation data. In this case, the ratio data corresponding to the front and back frames is 3:1

The interpolation processer 1120 interpolates the interpolation-target frame by using the ratio data and the macroblock type. The interpolation processer 1120 described in the present description sets the location of the interpolation-target pixel based on the macroblock type of the latter reference frame of the interpolation-target frame. Then, the interpolation processer 1120 can compute the pixel data of the interpolation-target pixel corresponding to the macroblock type and the ratio data differently.

In the present description, the back reference frame indicates the former frame of the interpolation-target frame based on the time axis. Also, the front reference frame indicates the latter frame of the interpolation-target frame based on the time axis.

Scanning the macroblock of the back reference frame in a scan line direction being set, the interpolation processer 1120 confirms and interpolates the interpolation-target frame corresponding to the pertinent macroblock type differently.

Hereinafter, the methods of interpolation according to the macroblock type are separately described.

(1) Skipping Macroblock (SKIP MB)

If the macroblock type of the back reference frame is a Skipping macroblock, the interpolation processer 1120 interpolates the interpolation-target frame by using the pixel data of the front and back reference frame and the ratio data at the same location of the interpolation-target frame.

For example, suppose that the pixel data of the front reference frame (namely, pixel value) is A, and the back reference frame (namely, pixel value) is B. Then, suppose that the frame interpolation data (namely, the number of frames that will be interpolated) is 4, and the interpolation-target frame is a first frame of the frame interpolation data.

In this case, the interpolation processer 1120 can compute the pixel value of the appropriate block of the appropriate interpolation-target frame as follows:

$$\text{Pixel Value} = A \times \frac{3}{4} + B \times \frac{1}{4}$$

(2) INTRA Macroblock (INTRA MB)

The interpolation processer 1120 records the pixel value by using the reference frame between the front and back reference frames adjacent to the interpolation-target frame. Computing the ratio data, if the ratio data is below the critical value, the interpolation processer 1120 computes the pixel value of the interpolation-target frame by using the front reference frame. However, if the ratio data is above the critical value, the interpolation processer 1120 computes the pixel value of the macroblock of the interpolation-target frame by using the back reference frame.

For example, suppose that the pixel data of the front reference frame (namely, pixel value) is A, and the back reference frame (namely, pixel value) is B. Then, suppose that the interpolation-target frame data (namely, the number of frames that will be interpolated) is 4, and the interpolation-target frame is a first frame of the frame interpolation data.

In this case, the macroblock of the interpolation-target frame is computed by using the pixel data of the front reference frame and the ratio data.

(3) INTER Macroblock (INTER MB)

In an INTER macroblock, each of the macroblocks has a motion vector (MV) value. The interpolation processer 1120 arrays the motion vector values for processing the INTER macroblock. For example, the motion vector values may be arrayed in ascending order or descending order. In the present description, for the convenience of description and understanding, it is assumed that the interpolation processer 1120 arrays the motion vector values in ascending order.

Also, although it is assumed that the interpolation processer 1120 processes the macroblock of the interpolation-target frame corresponding to the INTER macroblock after arraying the motion vector value, it shall be evident that the arraying of the motion vector may be omitted according to the method of implementation.

The interpolation processer 1120 may process each target block of the interpolation-target frame corresponding to the INTER macroblock differently according to the motion vector value.

A) When the Motion Vector Value is 1

If the motion vector value is 1, the interpolation processer 1120 processes at the same location of the pixel of the back reference frame (namely, the same location of the interpolation-target frame) by the same method of processing the SKIP MB. In the present description, the first value may be, for example, "0".

To be more specific, if the motion vector value is 1, the interpolation processer 1120 sets the pixel location of the back reference frame to the location of the target block of the interpolation-target frame. Then, the interpolation processer 1120 computes the pixel value of the target block by using the pixel data of the front and back reference frames and the ratio data.

B) When the Motion Vector Value is not 1 (Namely, Above 1)

The interpolation processer 1120 sets the location of the target block of the interpolation-target frame by using the pixel location and the motion vector of the back reference frame and the ratio data. The interpolation processer 1120 computes the pixel value of the appropriate target block by using the pixel data of the back reference frame, the pixel data at the location moved corresponding to the motion vector of the front reference frame and the ratio data. Consequently, the location of the target block of the interpolation-target frame may be overlapped. In this case, the interpolation processer 1120 may process the computed pixel value instead of the pixel value of the target block overlapped.

For example, suppose that the pixel location of the back reference frame is (10, 10), and the pixel value is 200. And suppose that the size of the motion vector of the back reference frame is (4, 8). Also, suppose that that the pixel location of the front reference frame is (14, 18), and the pixel value is 100. In this case, the location of the target pixel of the interpolation-target frame is as follows. Here, suppose that the interpolation-target frame is the first frame of the frame interpolation data (for example, 4; namely, it is assumed to be a first frame between four frames that will be continuously interpolated).

$$\text{Pixel Location} = \left(10 + \left(4 \times \frac{3}{4}\right), 10 + 8 \times \frac{3}{4}\right.$$

Namely, the location of the target pixel is computed as (13,16).

The pixel value of the target pixel is as follows:

$$\text{Pixel Value} = 100 \times \frac{3}{4} + 200 \times \frac{1}{4}$$

Similarly, the interpolation processer 1120 interpolates the interpolation-target frame by using the macroblock type and the ratio data.

The pixel padding unit 1130 pads the pixels that are not interpolated by the interpolation processer 1120. For example, the pixel padding unit 1130 scans the interpolation-target frame in the scan line direction, and pads the target pixel by using the value of adjacent pixels. If more than one pixel adjacent to the target pixel (for example, up/down/left/right) are interpolated, the target pixel may be padded to the average of the values of the interpolated pixels. At this time, in order to prevent the error of the target pixel, the pixels recorded by padding are excluded from the computing of the average of the target pixel, since the pixels are not interpolated by the interpolation processer 1120.

If some of the pixel values adjacent to the target pixel are not recorded, the pixel padding unit 1130 does not pad the pertinent pixel(s), and can pad the pertinent pixel(s) by using the padded pixel value after the padding process in scan line direction is completed.

The controller 1140 controls the internal component parts of the interpolator 1030 (for example, the data acquisition unit 1110, the interpolation processor 1120 and the pixel padding unit 1130).

Figure 12:
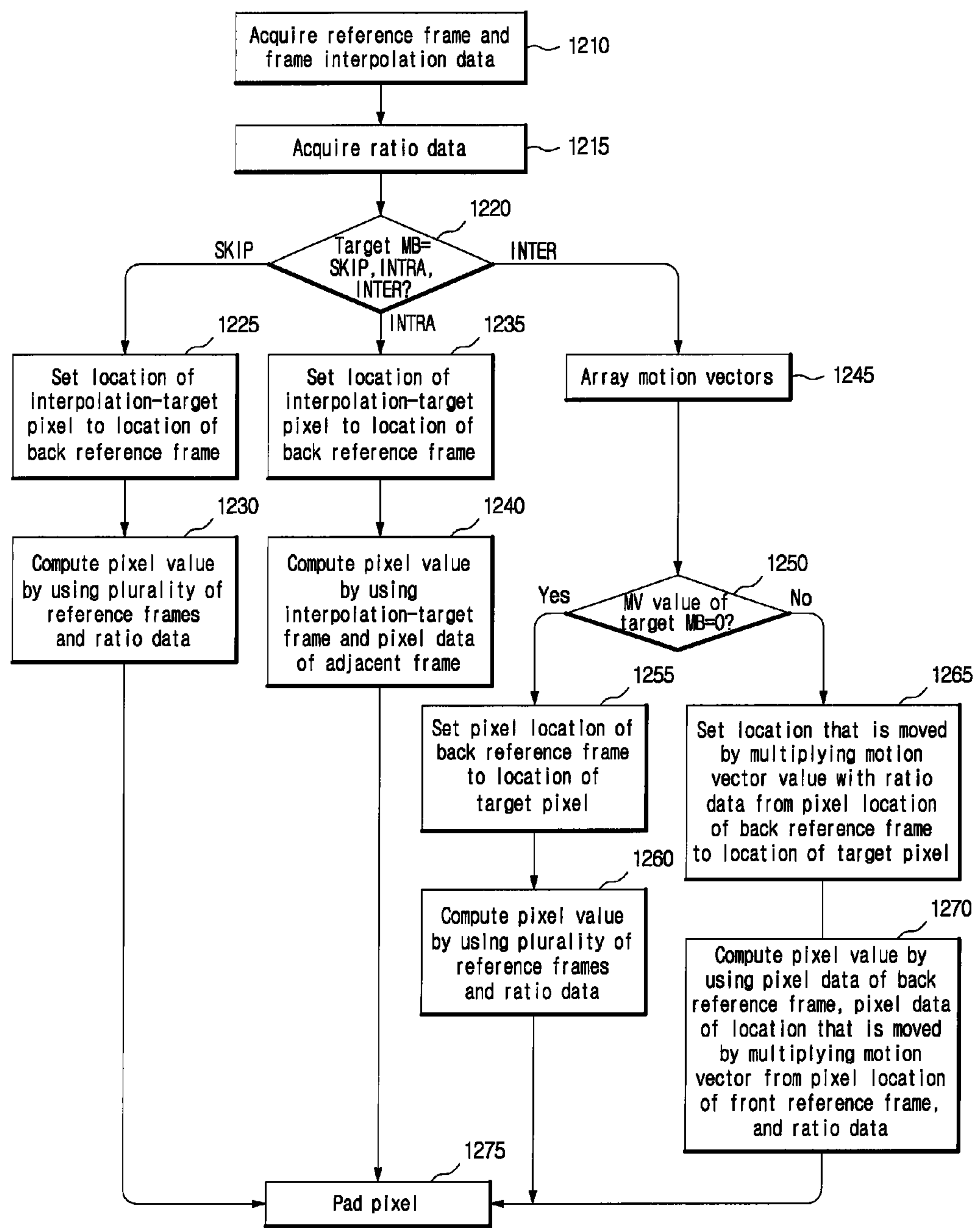
FIG. 12 is a flowchart showing a method of interpolating and decoding a skipped frame by a decoding apparatus in accordance with an embodiment of the present invention.
Figure 14:
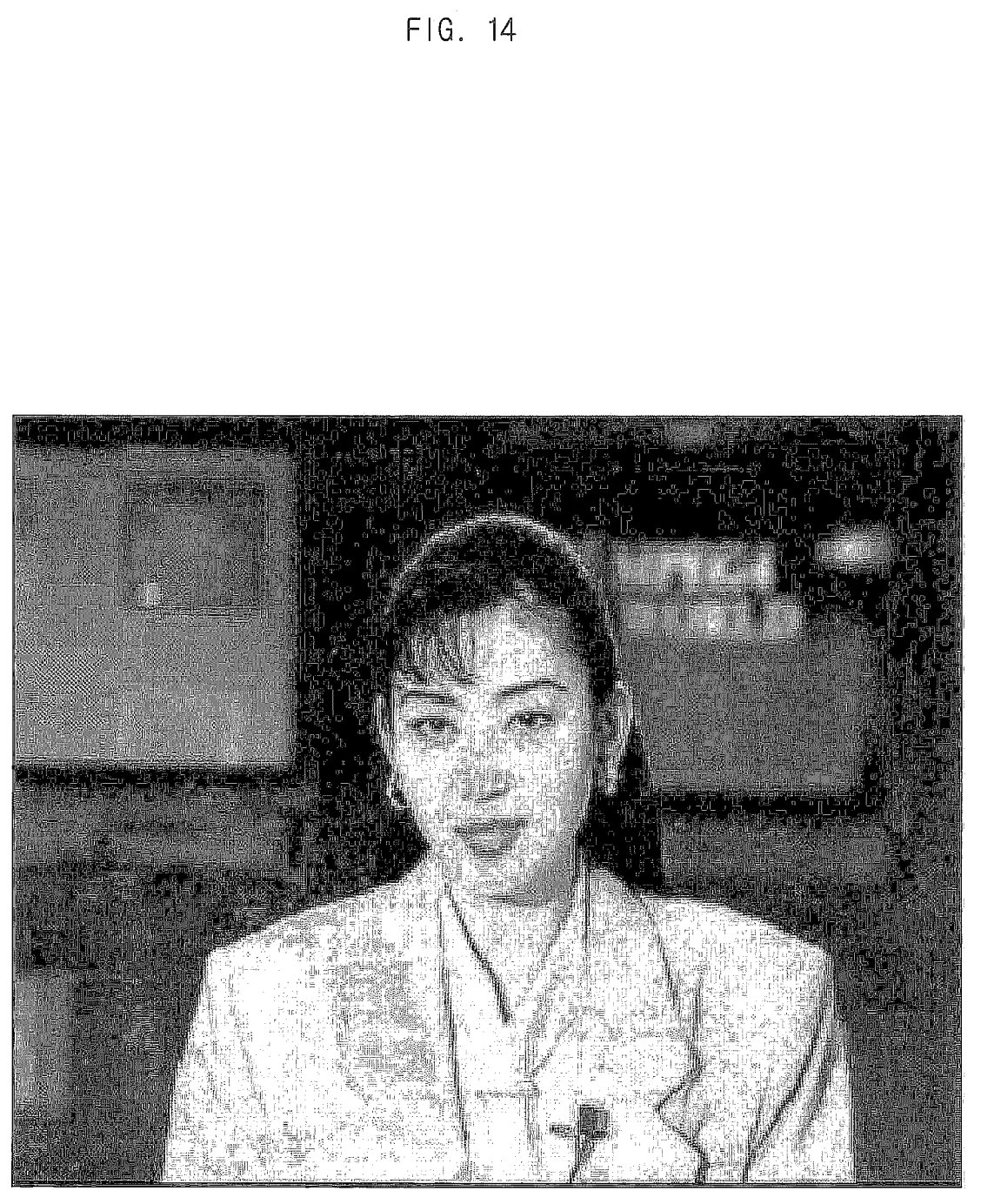
Figure 15:
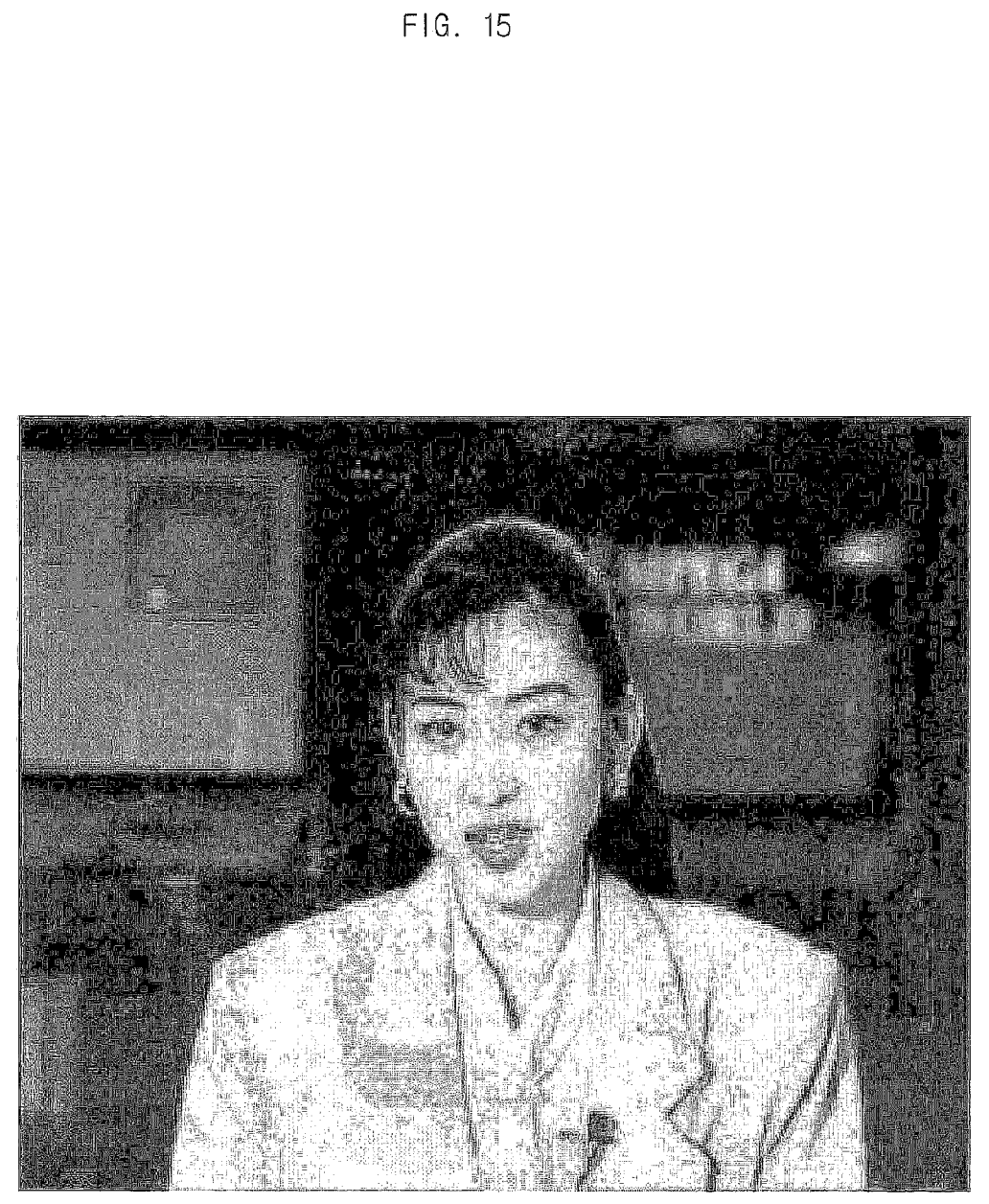
Figure 16:
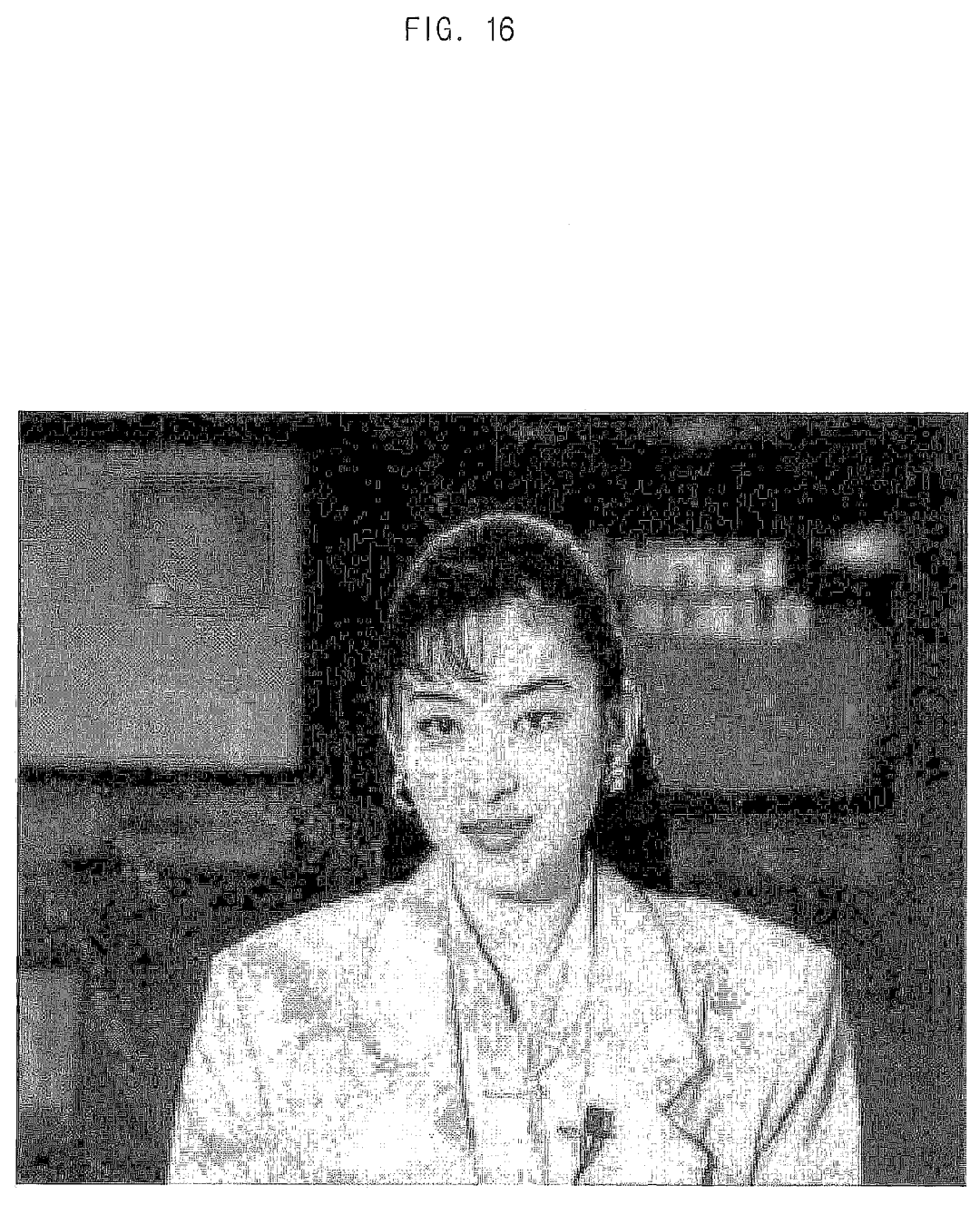
Figure 17:
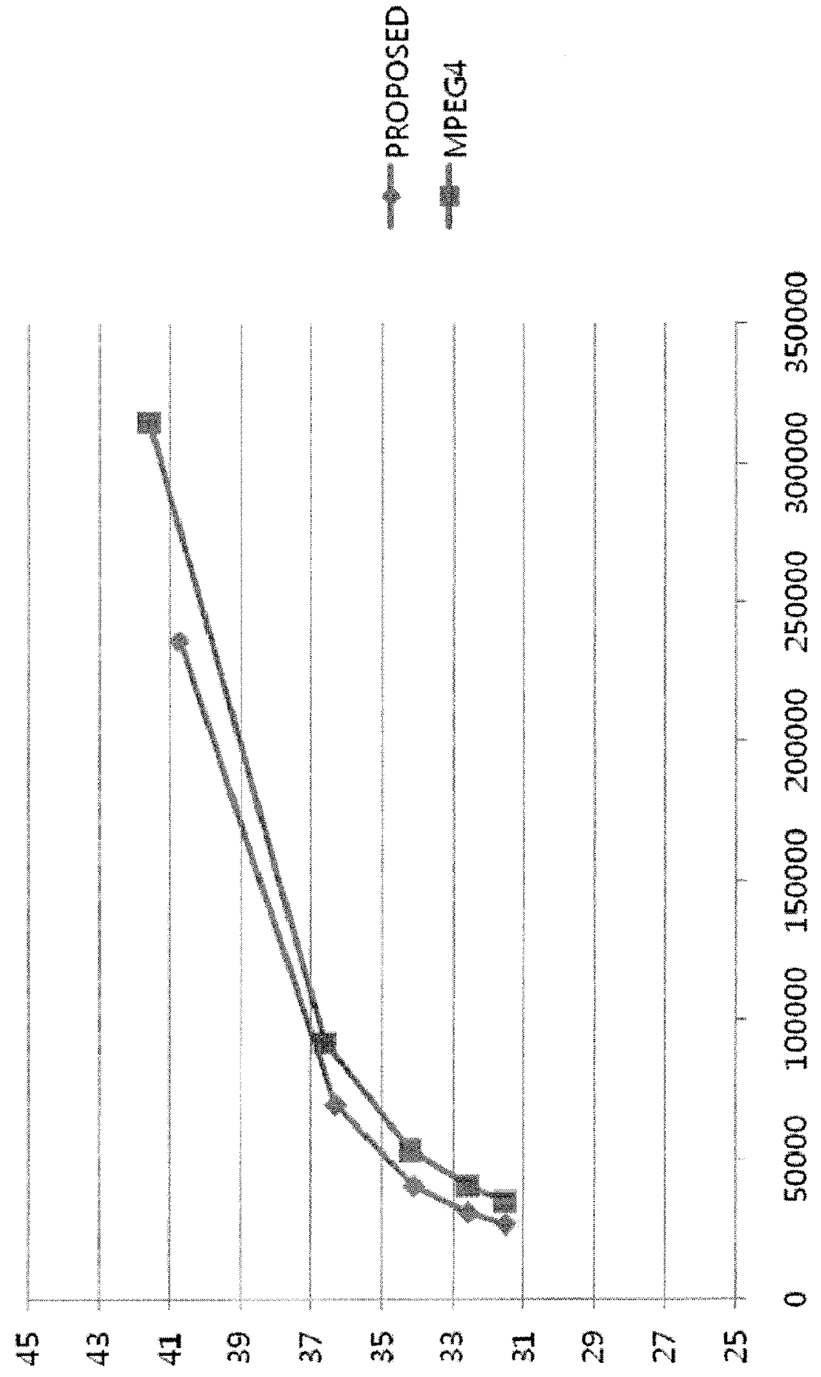
FIG. 17 is a graph showing the rate-distortion in accordance with an embodiment of the present invention.

FIG. 12 is a flowchart showing a method of interpolating and decoding a skipped frame by a decoding apparatus in accordance with an embodiment of the present invention, and FIG. 13 through FIG. 16 show interpolation-target frames in accordance with an embodiment of the present invention. FIG. 17 is a graph showing the rate-distortion in accordance with an embodiment of the present invention.

Hereinafter, because the ordinary the decoding process of the video is obvious to a person skilled in the art, the additional description will be omitted. Also, although each of the steps is performed by each of the internal component parts of the decoding apparatus 1000 as below, they will be described as the decoding apparatus, for the convenience of description and understanding.

In the step 1210, the decoding apparatus 1000 acquires more than one data of the reference frame and the frame interpolation data. Here, the data of the reference frame may be the pixel data of the reference frames, the data of the macroblock of the reference frame (namely, macroblock type) and the data of the motion vector.

In the step 1215, the decoding apparatus 1000 computes the ratio data by using the data of the reference frame and the interpolation frame data.

In the step 1220, the decoding apparatus 1000 confirms the macroblock type of the back reference frame in the scan line direction.

If the macroblock type is SKIP MB, in the step 1225, the decoding apparatus 1000 sets the location of the interpolation-target pixel of the interpolation-target frame to the same location of the back reference frame.

In the step 1230, the decoding apparatus 1000 computes the pixel value of the target pixel by using the pixel data of the back and front reference frame and the ratio data.

However, if the macroblock type is INTRA MB, in the step 1235, the decoding apparatus 1000 sets the location of the interpolation-target pixel of the interpolation-target frame to the same location of the back reference frame.

In the step 1240, the decoding apparatus 1000 computes the pixel value of the interpolation-target pixel by using the pixel data of the reference frame adjacent to the interpolation-target frame.

For example, if the ratio data is below the critical value, the decoding apparatus 1000 uses the pixel data of the back reference frame as the pixel value of the target pixel. However, if the ratio data is above the critical value, the decoding apparatus 1000 uses the pixel data of the front reference frame as the pixel value of the target pixel.

As a result of the step 1220, if the macroblock type is INTER MB, in the step 1245, the decoding apparatus 1000 arrays the motion vectors according to the array method, which is previously set.

In the present description, for the convenience of description and understanding, it is assumed that the motion vector value is arrayed in ascending order. Of course, it shall be evident that the step 1245 can be omitted depending on the implementation method.

In the step 1250, the decoding apparatus 1000 checks whether the motion vector value is the first value. Here, the first value may be "0". The decoding apparatus 1000 differently interpolates the interpolation-target frame depending on whether or not the motion vector value is the first value.

If the motion vector value is the first value, in the step 1225, the decoding apparatus 1000 sets the location data of the back reference frame to the location of the target pixel.

In the step 1260, the decoding apparatus 1000 computes the value of the target pixel by using the pixel data of the back and front reference frames and the ratio data.

However, if the motion vector value is not the first value, in the step 1265, the decoding apparatus 1000 sets the location that is moved by multiplying the motion vector value with the ratio data from the pixel location of the back reference frame to the location of the target pixel.

In the step 1270, the decoding apparatus 1000 computes the pixel value of the target pixel by using the pixel data of the back reference frame, the pixel data of the location that is moved by multiplying the motion vector from the pixel location of the front reference frame, and the ratio data.

In the step 1275, the decoding apparatus 1000 scans the interpolation-target frame in the scan line direction, and pads the pixels that are not interpolated.

For example, the decoding apparatus 1000 pads the padding-target pixel by using the value of the interpolated pixels adjacent to the padding-target pixel. In other word, the decoding apparatus 1000 can pad the padding-target pixel by using the average of the values of the interpolated pixels adjacent to the padding-target pixel. At this time, in order to prevent the error, the decoding apparatus 1000 may not use the pixels that are not interpolated in the padding process. However, if all of the pixel values adjacent to the padding-target pixel are not interpolated, the decoding apparatus 1000 pads the padding-target pixels by using the padded pixels after the first padding process in the scan line direction is completed.

FIG. 13 through FIG. 16 illustrates the back reference frame, the interpolated interpolation-target frame, and the front reference frame.

FIG. 17 is a graph showing the rate-distortion of the Akiyo video. The data of the Akiyo video in FIG. 17 is in table 5 below.

TABLE 5

| sequence | resolution | frame | threshold | MCS |
|---|---|---|---|---|
| Akiyo | 352 × 288 | 300 | 40 | 5 |

As shown in FIG. 17, it can be inferred that a greater compression efficiency than MPEG-4 can be obtained.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

INDUSTRIAL APPLICABILITY

The present invention can be used for video codec.

The invention claimed is:

1. An apparatus for decoding by using interpolation, the apparatus comprising:

a decoder configured to decode an inputted bitstream;

a data acquisition unit configured to acquire interpolation frame data, one or more reference frames, a macroblock type and one or more motion vector values from the decoder; and an interpolation processor configured to compute ratio data of an interpolation-target frame by using the interpolation frame data, and interpolating the interpolation-target frame by using the ratio data, pixel data of the one or more reference frames or the motion vector value according to the macroblock type, wherein the interpolation processor sets a same location of a pixel of a back reference frame as a location of an interpolation-target pixel of the interpolation-target frame if the macroblock type is a skipping macroblock (SKIP MB) or an INTRA macroblock (INTRA MB), wherein, if the macroblock type is the skipping macroblock (SKIP MB), the interpolation processor computes a pixel value of the interpolation-target pixel by multiplying one or more pixel data of the back reference frame and a front reference frame with the ratio data, and wherein, if the macroblock type is the INTRA macroblock (INTRA MB), the interpolation processor computes the pixel value of the interpolation-target pixel by using one or more pixel data of a reference frame between the front reference frame and the back reference frame adjacent to the interpolation-target frame, and wherein the ratio data is a ratio between a number of one or more interpolation-target frames and a number according to an order of an interpolation-target frame that is interpolated at a present time among the interpolation-target frames.

2. The apparatus of claim 1, wherein, if the macroblock type is the INTER macroblock (INTER MB), the interpolation processor sets a location moved by multiplying the motion vector value with the ratio data from the pixel location of the back reference frame as the location of the interpolation-target pixel, and computes the pixel value of the interpolation-target pixel by multiplying the pixel data of the back reference frame and the pixel data of the location, which is moved by the motion vector value from the front reference frame, with the ratio data.

3. A method of decoding a skipped frame by using interpolation, the decoding performed by a decoding apparatus, the method comprising:

decoding an inputted bitstream and acquiring interpolation frame data, one or more reference frames, a macroblock type and a motion vector value;

computing ratio data of an interpolation-target frame by using the interpolation frame data; and interpolating the interpolation-target frame differently by using the ratio data, pixel data of the one or more reference frames or the motion vector value according to the macroblock type, wherein if the macroblock type is a skipping macroblock (SKIP MB) or an INTRA macroblock (INTRA MB), the interpolating of the interpolation-target frame comprises:

setting a pixel location of a back reference frame as a location of an interpolation-target pixel of the interpolation-target frame, computing a pixel value of the interpolation-target pixel by multiplying one of one or more pixel data between the back reference frame and a front reference frame with the ratio data, if the macroblock type is the skipping macroblock (SKIP MB), and computing the pixel value of the interpolation-target pixel by using one or more pixel data of a reference frame between the front reference frame and the back reference frame adjacent to the interpolation-target frame, if the macroblock type is the INTRA macroblock (INTRA MB), wherein the ratio data is a ratio between a number of one or more interpolation-target frames and a number according to an order of an interpolation-target frame that is interpolated at a present time among the interpolation-target frames.

4. The method of claim 3, wherein, if the macroblock type is the INTER macroblock (INTER MB), the interpolating of the interpolation-target frame comprises:

setting a location moved by multiplying the motion vector value with the ratio value from the pixel location of the back reference frame as a location of an interpolation-target pixel of the interpolation-target frame; and computing the pixel value of the interpolation-target pixel by multiplying the pixel data of the back reference frame and the pixel data of the location, which is moved by the motion vector from the front reference frame, with the ratio data.

* * * * *